United States Patent [19]

Marsault et al.

[11] Patent Number: 4,469,236

[45] Date of Patent: Sep. 4, 1984

[54] STORAGE VESSEL SUPPORT DEVICE

[75] Inventors: Jean-Jacques Marsault, Saint-Arnoult-en-Yvelines; Jean-Claude Semedard, Paris; Jean-Pierre Peyrelongue, Pontchartrain, all of France

[73] Assignees: Stein Industrie; Electricite de France, both of France

[21] Appl. No.: 413,314

[22] Filed: Aug. 31, 1982

[30] Foreign Application Priority Data

Sep. 4, 1981 [FR] France ................................ 81 16838

[51] Int. Cl.³ ............................................. B65D 90/12
[52] U.S. Cl. ....................................... 220/1.5; 220/71; 220/401; 220/435; 220/437
[58] Field of Search .................. 220/1.5, 71, 401, 435, 220/437

[56] References Cited

U.S. PATENT DOCUMENTS 4,065,022 12/1977 Cainand ................................ 220/71
4,098,426 7/1978 Gerhard ........................... 220/410 X
4,354,612 10/1982 Pelabon ............................... 220/401

FOREIGN PATENT DOCUMENTS 568641 1/1933 Fed. Rep. of Germany .
1165624 3/1964 Fed. Rep. of Germany .
2168674 8/1973 France .
1179368 1/1970 United Kingdom .
2032087 4/1980 United Kingdom ................ 220/437

Primary Examiner—Allan N. Shoap
Attorney, Agent, or Firm—Sughrue, Mion, Zinn, Macpeak and Seas

[57] ABSTRACT

A support device for a heavy horizontal storage vessel having convex ends and walls which are thin in relation to its diameter comprises, at each end of the vessel, a short annular stiffener (8) coaxial with the end. It is of sufficient diameter to distribute and reduce stresses to a low value. A flexible semi-circular steel plate member (9) cradles the stiffener with limited clearance (11). A rigid annular plate member (10) is disposed in substantially the same vertical plane as the stiffener (8) and semi-circular plate member (9) to form a cradle for plate member (9) over part of its periphery. The radius of curvature of the annular plate member (10) is sufficiently greater than that of the semi-circular flexible plate member (9) to permit differential radial expansion. The rigid annular plate member is thus axially and laterally connected to the stiffener by appropriate structure. A specific application of the invention is to storage vessels for hot liquefied sodium in power generation plant using superregenerative nuclear reactors.

4 Claims, 5 Drawing Figures

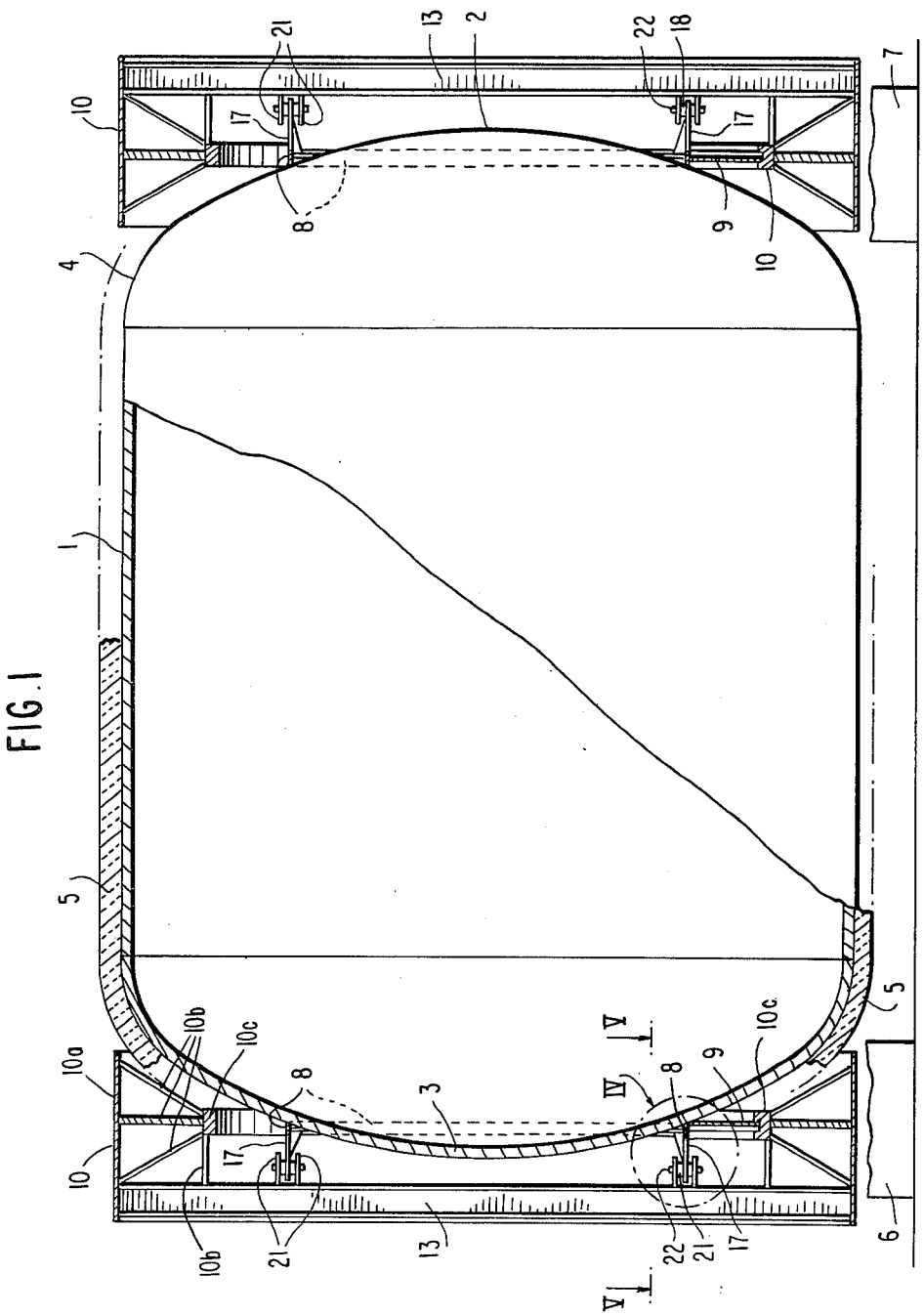

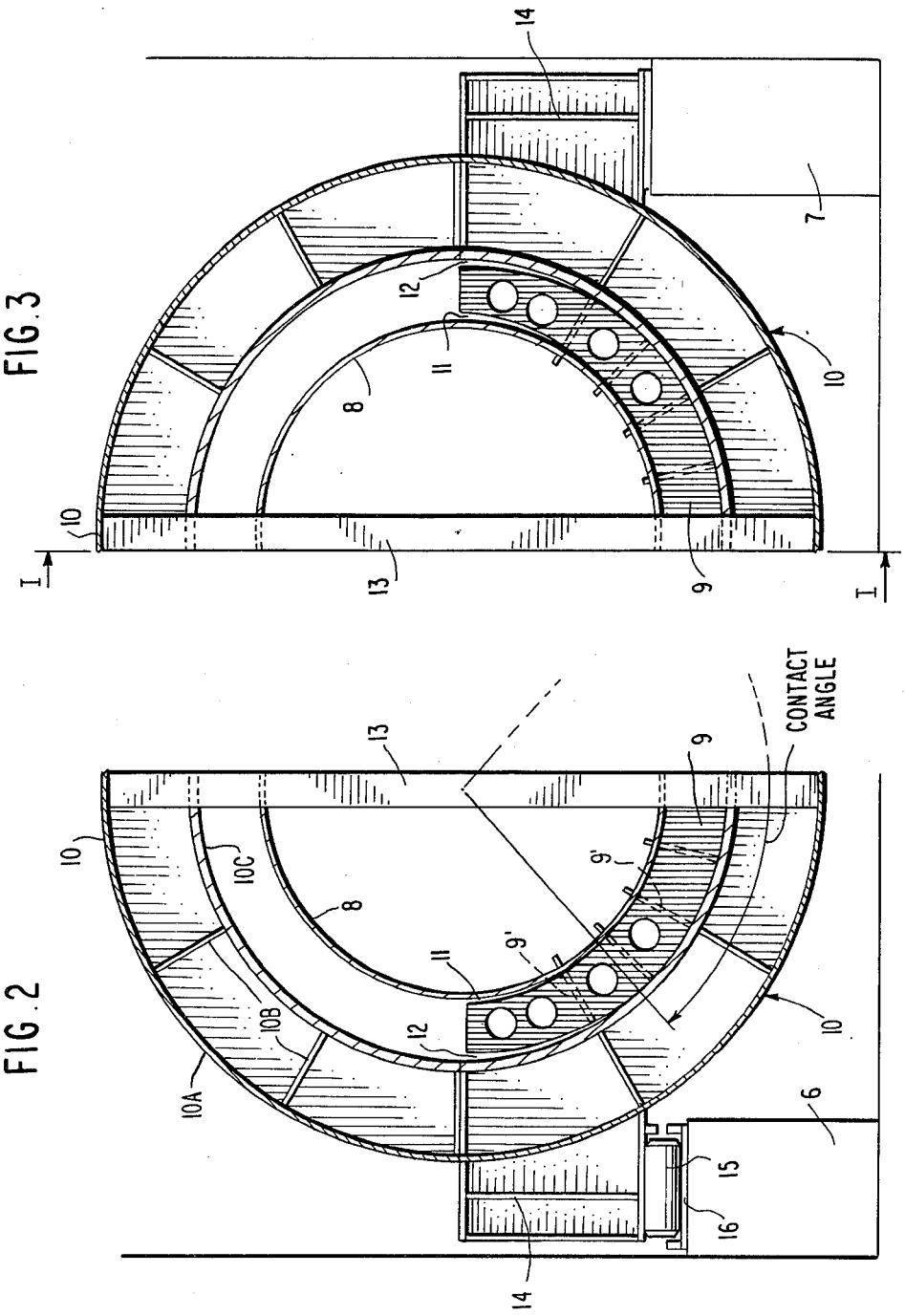

STORAGE VESSEL SUPPORT DEVICE

BACKGROUND OF THE INVENTION

1. Field of the Invention

The present invention concerns a support device for a heavy horizontal storage vessel having convex ends and walls which are thin in relation to its diameter and which is subject to large temperature variations.

2. Description of the Prior Art

Document EP-A1 No. 12258 discloses support devices for pipes having walls which are thin in relation to their diameter and which are subject to large temperature variations. Such devices are not suitable for horizontal axis storage vessels able to contain a relatively dense liquid and therefore exerting high stresses on their supports, as they would call for very large component parts, extremely bulky and making it very difficult to fit heat insulation.

The object of the present invention is to provide for supporting a horizontal storage vessel by transmitting loads tangentially to the convex ends, to avoid transverse bending stresses and flanging stresses due to radial thermal expansion.

SUMMARY OF THE INVENTION

The invention consists in a support device for a heavy horizontal storage vessel having convex ends and walls which are thin in relation to its diameter, said device comprising, at each end of said vessel, a short annular stiffener coaxial with said end and of sufficient diameter to distribute and reduce stresses to a low value, a rigid annular plate member disposed in substantially the same vertical plane as said stiffener to form a cradle for said stiffener over part of its periphery, its radius of curvature being greater than that of said stiffener to an extent sufficient to permit differential radial expansion, and means adapted to connect said rigid annular plate member axially and laterally to said stiffener.

The invention advantageously consists further in at least one of the following characteristics.

It further comprises at each end of said vessel a flexible semi-circular plate member partially surrounding said stiffener, said rigid annular plate member forming a cradle for said flexible semi-circular plate member and the radius of curvature of said rigid annular plate member being greater than that of said flexible semi-circular plate member to an extent sufficient to permit differential radial expansion.

When said storage vessel is of stainless steel, said stiffener and said flexible semi-circular plate member surrounding said stiffener are of stainless steel and said rigid plate member is of carbon steel.

Said rigid annular plate member is provided with a vertical cross-piece which improves its rigidity.

Said stiffener incorporates lugs and said annular plate member incorporates vertical pins engaged in said lugs.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 1 is a side elevation showing the storage vessel and its support device.

FIG. 2 shows the lefthand part of the storage vessel and its support device as seen along the storage vessel axis from the lefthand end as seen in FIG. 1.

FIG. 3 shows the righthand part of the storage vessel and its support device as seen along the storage vessel axis from the righthand end as seen in FIG. 1.

DESCRIPTION OF THE PREFERRED EMBODIMENT

Figure 4:
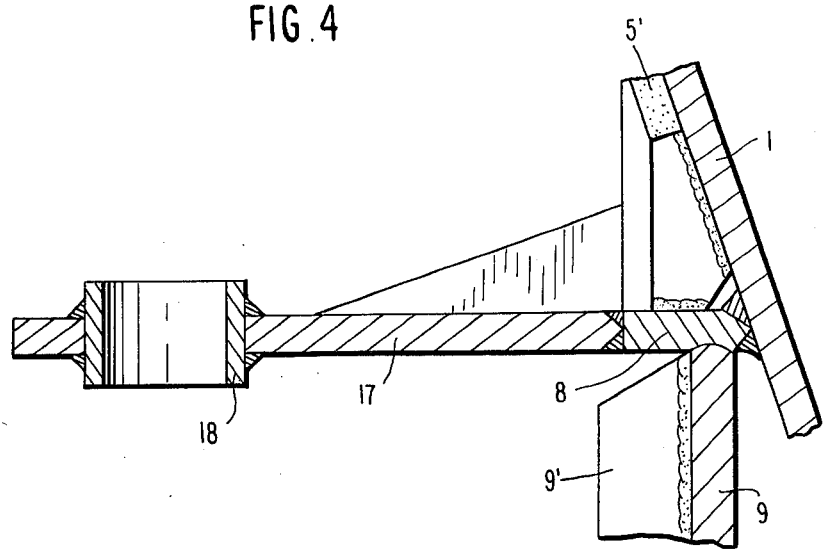
FIG. 4 shows that part of the storage vessel and its support device of FIG. 1 marked IV to a larger scale.

Referring to FIGS. 1 to 3, the stainless steel storage vessel 1 has ends 2 and 3 which are spherical in the vicinity of the axis with a toroidal intermediate area 4. It is surrounded by heat insulation 5 and supported on concrete foundations 6 and 7.

Each end is supported by an annular stiffener 8, also of stainless steel, supported on a flexible semi-circular stainless steel plate member 9 forming a cradle, with very limited clearance at 11. Flexible semi-circular member 9 is itself supported over part of its periphery on a rigid carbon steel plate member 10 forming a cradle, with greater clearance at 12, the radius of curvature of the rigid member 10 being greater than that of the flexible member 9 and the radius of curvature of the flexible member 9 is greater than that of annular stiffener 8 to permit differential radial expansion. The contact angle is 60°, for example.

Rigid member 10 is attached to a vertical strut 13 at 10a, 10b, 10c which stiffens it, and carries pins adapted to position the supporting members longitudinally, as will be described hereinafter.

It further comprises supporting webs 14 which bear on concrete foundations 6 and 7 through the intermediary of rollers 15 which roll on rollways 16 to permit longitudinal expansion of the storage vessel. At one end of the storage vessel webs 14 bear directly on the corresponding concrete foundation to form a fixed point of reference for such expansion.

FIG. 4 shows in detail part of stiffener 8, bearing on flexible member 9, to which is welded a lug 17 comprising near its end a bush 18 through which passes a pin attached to the rigid cradle member so as to couple the storage vessel to its support while permitting differential expansion.

Figure 5:
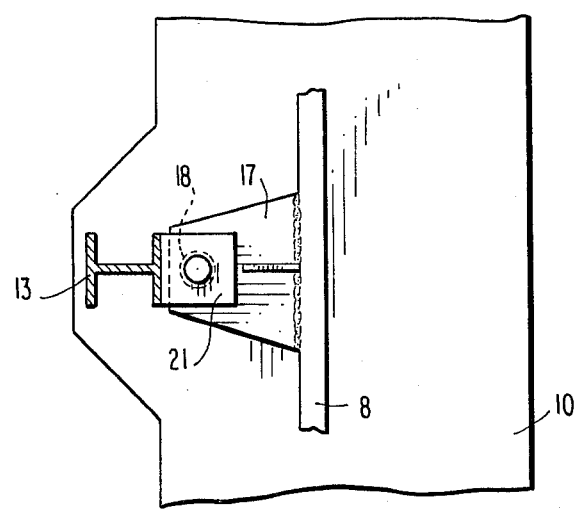
FIG. 5 is a cross-section on the line V—V in FIG. 1.

One of the stiffener connecting devices attached to the storage vessel is shown from above and to a larger scale in FIG. 5. This figure shows lug 17 attached to the stiffener. Vertical strut 13 carries two horizontal lugs 21 joined by a vertical pin 22. This engages in bush 18 of lug 17 to guide the supporting cradle, while allowing the storage vessel to expand freely in the longitudinal and vertical directions. Thus, vertical strut 13 and horizontal lug 17 define means for connecting rigid annular plate 10 axially and laterally to the stiffener 8 as seen in FIGS. 4 and 5, with pin 22 permitting differential expansion. As shown in FIG. 1, each of the end stiffeners comprises two guide devices disposed on a common vertical in the plane of vertical symmetry of the storage vessel for lateral guiding of the storage vessel relative to its support.

It will be understood that various changes in the details, materials and arrangements of parts, which have been herein described and illustrated in order to explain the nature of the invention, may be made by those skilled in the art within the principle and scope of the invention as expressed in the appended claims.

We claim:

1. A support device for a heavy horizontal storage vessel having convex ends and walls which are thin in relation to its diameter, said device comprising, at each end of said vessel, a short annular stiffener coaxial with said vessel end and being of sufficient diameter to distribute and reduce stresses to a low value, a flexible semi-circular plate member forming a cradle for said stiffener, its radius of curvature being greater than that of said stiffener to an extent sufficient to permit differential radial expansion, a rigid annular plate member disposed substantially in the same vertical plane as said stiffener, forming a cradle for said flexible plate member, its radius of curvature being greater than that of said flexible plate member to an extent sufficient to permit differential radial expansion, and means for connecting said rigid annular plate member axially and laterally to said stiffener.

2. A device according to claim 1, for a storage vessel of stainless steel, wherein said stiffener and said flexible circular plate member surrounding said stiffener are of stainless steel and said rigid plate member is of carbon steel.

3. A device according to claim 1, wherein said rigid annular plate member incorporates a vertical strut to increase its stiffness.

4. A device according to claim 1, wherein said stiffener incorporates lugs and said annular plate member incorporates pins engaged with said lugs.

* * * * *